Oct. 21, 1958 N. PERLMUTTER 2,857,516

ELECTRONIC COMMUTATION CIRCUIT

Original Filed Aug. 29, 1951 2 Sheets-Sheet 1

INVENTOR.
Norman Perlmutter,
BY
Fidler, Crane & Beardsley
Atty's.

ELECTRONIC COMMUTATION CIRCUIT

Original Filed Aug. 29, 1951 2 Sheets-Sheet 2

INVENTOR.
Norman Perlmutter,
BY
Fidler, Crouse & Beardsley.
Atty's.

2,857,516

ELECTRONIC COMMUTATION CIRCUIT

Norman Perlmutter, El Cerrito, Calif., assignor to Burroughs Corporation, Detroit, Mich., a corporation of Michigan

Continuation of application Serial No. 244,179, August 29, 1951. This application October 21, 1955, Serial No. 541,997

15 Claims. (Cl. 250—27)

This application for Letters Patent is a continuation of applicant's copending application Serial No. 244,179, filed August 29, 1951, and now abandoned. It concerns an invention relating to electronic binary commutation or counting circuits of the kind comprising a "flip-flop" provided with triggering input circuit means adapted, upon receipt of successive input pulses, to cause the "flip-flop" to operate alternately from one of its stable conditions to the other. In this application the "flip-flop" circuitry will be described with specific reference to its use in connection with a single pair of vacuum tubes.

Such commutation circuits, heretofore, have not been sufficiently reliably operable at desirable high operating frequencies. The reliability of operation of the prior circuits of that kind has been dependent upon the form and duration of the input trigger pulses and relatively small variations in the shape and length of the input pulses often caused uncertainty of operation which was further increased by relatively small variations in values of circuit components and, especially, by such changes in characteristics of the vacuum tubes as are caused by aging after comparatively short periods of use.

An object of the invention is to provide a new electronic commutation circuit in a "flip-flop" circuit and having improved reliability of operation at a high operating frequency of the order of several hundred thousand cycles per second.

A further object is to provide a new circuit of the above-mentioned kind and having high reliability of operation with greatly increased tolerance of variations in form and duration of input triggering pulses.

A further object is to provide a new circuit of the above-mentioned kind which will maintain a very high degree of reliability of operation at high operating frequencies of the order of several hundred thousand cycles per second while tolerating variations in values of circuit components and in characteristics of the vacuum tubes much greater than could be tolerated heretofore.

A further object is to obtain substantially increased reliability of operation at operating frequencies of the order of several hundred thousand cycles per second with greatly increased tolerance of variations in values of circuit components and in tube characteristics in an electronic commutator circuit of fairly simple design and having a comparatively small number of components.

An important feature of the present invention resides in the provision of a bi-stable or flip-flop circuit employing a pair of vacuum tubes each having a cathode, an anode and a control electrode, and input circuit means which couple said control electrodes to a common input and maintain the potentials on said control electrodes within limits selected for reliability of operation of said flip-flop circuit. The values of circuit elements of the flip-flop circuit are selected so that the required potentials on the control electrodes of the vacuum tubes will be produced even when there is considerable variation from the selected values of the circuit components, whereby an important degree of tolerance of variation in values of circuit components and of variation in operating conditions and character of input is secured while maintaining a high order of reliability of operation. The values of the circuit components are preferably selected so that the required potentials are produced on the control electrodes of the tubes even when the emissivity of the cathodes of the vacuum tubes is diminished, as by aging, to a small part of the normal emissivity of a new tube, whereby greatly lengthened useful life of the tubes is obtained while maintaining a high order of reliability of operation.

The foregoing and other novel features and advantages of the invention will be apparent from the following description of two embodiments of the invention illustrated, by way of example, in the accompanying drawings in which.

Figures 1, 2:
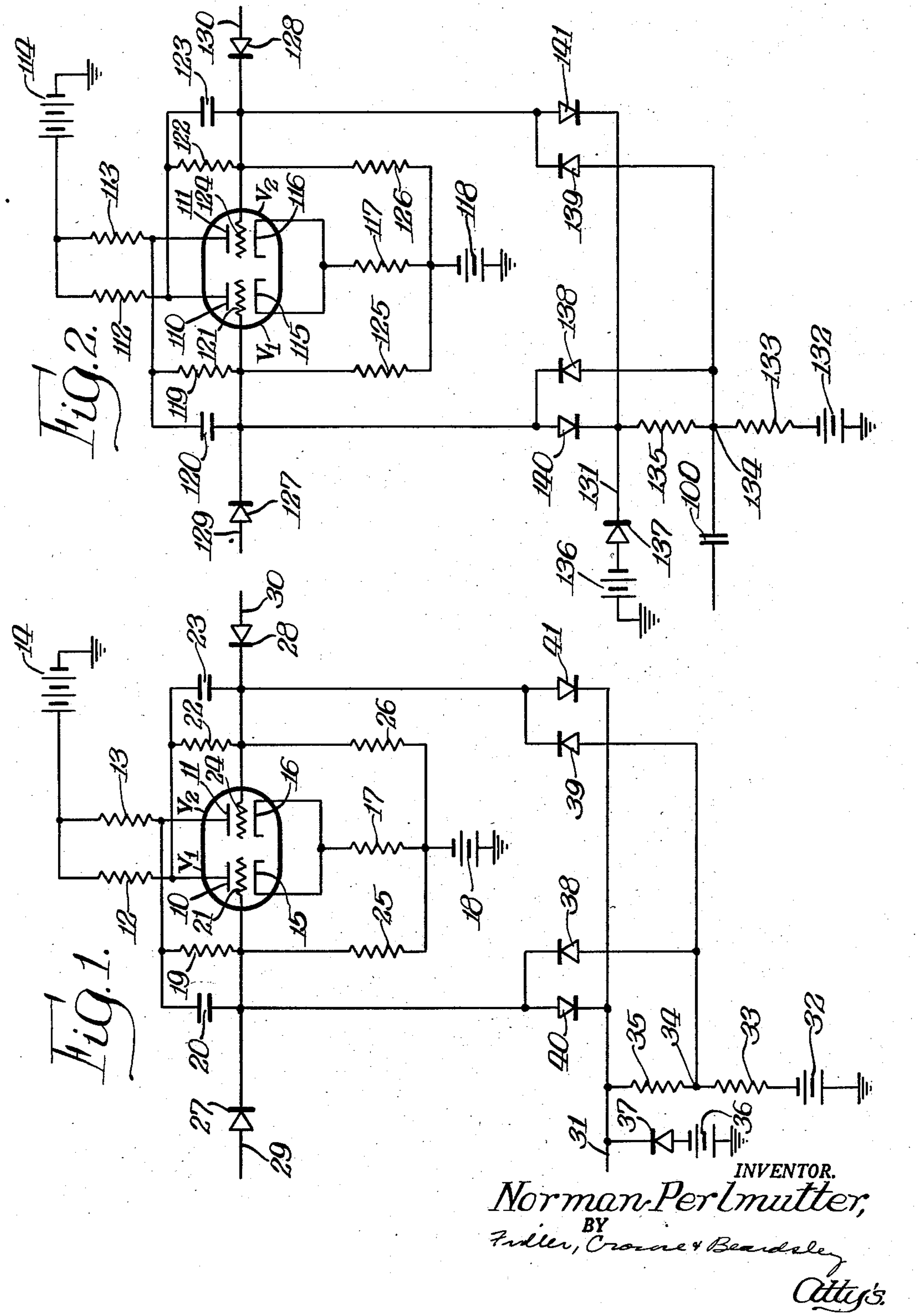
Figure 1 is a diagram of the circuit of one embodiment of the invention.
Fig. 2 is a diagram of the circuit of a second embodiment of the invention.

In Fig. 1 the anodes 10 and 11 of two vacuum triodes V1 and V2 are connected through resistors 12 and 13, respectively, to the positive terminal of a battery 14, the negative terminal of which is grounded. The cathodes 15 and 16 of the tubes V1 and V2 are both connected to one terminal of a resistor 17, the other terminal of which is connected to the negative terminal of a battery 18 having its positive terminal grounded. A resistor 19 and condenser 20 are connected in parallel between the anode 11 of the tube V2 and the grid 21 of the tube V1. Similarly, a resistor 22 and condenser 23 are connected in parallel between the anode 10 of the tube V1 and the grid 24 of the tube V2. Resistors 25 and 26 are connected between the negative terminal of the battery 18 and the grids 21 and 24, respectively. The grids 21 and 24 are connected, respectively, to the cathodes of two diodes 27 and 28, to the anodes of which, separate setting and resetting input conductors 29 and 30, respectively, are connected.

The circuit arrangement described immediately above corresponds to a common form of flip-flop circuit, the mode of operation of which need not be described in detail at this point. However, in the present case, the values of the resistors and voltages of the batteries are so chosen with respect to the characteristics of the vacuum tubes V1 and V2 that, in the absence of further provisions, they would produce on the grid of whichever of the tubes V1 or V2 is in its stable conducting state a potential which is substantially higher, and on the grid of whichever of the tubes V1 or V2 is in its stable substantially non-conducting state a potential which is substantially lower, than the potentials required on those grids, respectively, for reliable operation of the flip-flop circuit while the characteristics of the tubes are near the average new-tube values. Preferably, the values of circuit components are chosen so as to tend to produce on the grid of whichever tube is conducting, a potential which exceeds the potential selected to be maintained on that grid in the absence of an input impulse, by an amount which is a little greater than the potential amplitude of the contemplated input impulse.

A common third input conductor 31 is coupled with both of the grids 21 and 24 through input coupling circuit means having provisions for limiting the potentials on the grids 21 and 24 to values adequate for highly reliable operation of the flip-flop circuit. A battery 32, having its positive terminal grounded, has its negative terminal connected through a resistor 33 to a junction 34 which, in turn, is connected through a resistor 35 to the input conductor 31. A battery 36, also having its positive terminal grounded, has its negative terminal connected to the anode of a diode 37, the cathode of which is connected to the input conductor 31. The junction 34 between the resistors 33 and 35 is connected to the anodes of two diodes 38 and 39, the cathodes of which are connected, respectively, to the grids 21 and 24. The input conductor 31 is connected to the cathodes of two diodes 40 and 41, the anodes of which are connected, respectively, to the grids 21 and 24.

The voltage of the battery 36 is such as to prevent the potential on the conductor 31 from falling below the potential which is desired on the grid of whichever of the tubes V1 or V2 is in its stable conducting state. Because of the high back impedance of the diode 37, the battery 36 cannot prevent the potential on the conductor 31 from rising above that value, as when a positive input pulse is applied to the conductor 31. The values of the resistors 33 and 35 and the voltage of the battery 32 are chosen so as normally to maintain on the junction 34 the potential which is desired on the grid of whichever of the tubes V1 and V2 is in its stable substantially non-conducting state. Because of the diodes 38 and 39, the potential of the grid of the substantially non-conducting tube V1 or V2 cannot drop appreciably below the potential of the junction 34 althrough these diodes permit the potential of the grid of the conducting one of the tubes to be susbtantially higher than that value. Also, because of the diodes 40 and 41, the potential on the grid of the conducting one of the tubes is prevented from rising appreciably above the potential of the conductor 31, though these diodes permit the potential on the grid of the non-conducting tube to be substantially below that value.

A larger number of vacuum tubes now avaliable are well suited for use in the circuit of the present invention with proper values selected for the other components of the ciruit to suit the characteristics of the selected tubes. By way of example, the tubes V1 and V2 may be constituted by a twin triode 12AV7 manufactured by the Lansdale Tube Company. When such 12AV7 tubes are employed, the values of the circuit components of Fig. 1 may advantageously be as follows:

*Resistors*

| Ref. No.: | Ohms |
|---|---|
| 12 | 13,000 |
| 13 | 13,000 |
| 17 | 13,000 |
| 19 | 110,000 |
| 22 | 110,000 |
| 25 | 82,000 |
| 26 | 82,000 |
| 33 | 36,000 |
| 35 | 7,200 |

*Batteries*

| Ref. No.: | Voltage |
|---|---|
| 14 | 250 |
| 18 | 150 |
| 32 | 105 |
| 36 | 15 |

*Condensers*

| Ref. No.: | Mmf. |
|---|---|
| 20 | 10 |
| 23 | 10 |

The curves of Figs. 1A to 1D, inclusive, show approximately the changes of potentials at the points of the circuit of Fig. 1 designated by the same reference numbers, in an operation of the circuit from the stable condition in which the tube V1 is substantially non-conducting and the tube V2 is conducting to the other stable condition in which the tube V1 is conducting and the tube V2 is substantially non-conducting, when the 12AV7 tubes and circuit component values stated above, by way of example, are employed. In Figs. 1A to 1D, the absicissas represent time and ordinates represent potentials.

Figures 1A, 1B, 1C, 1D, 2A, 2B, 2C, 2D:
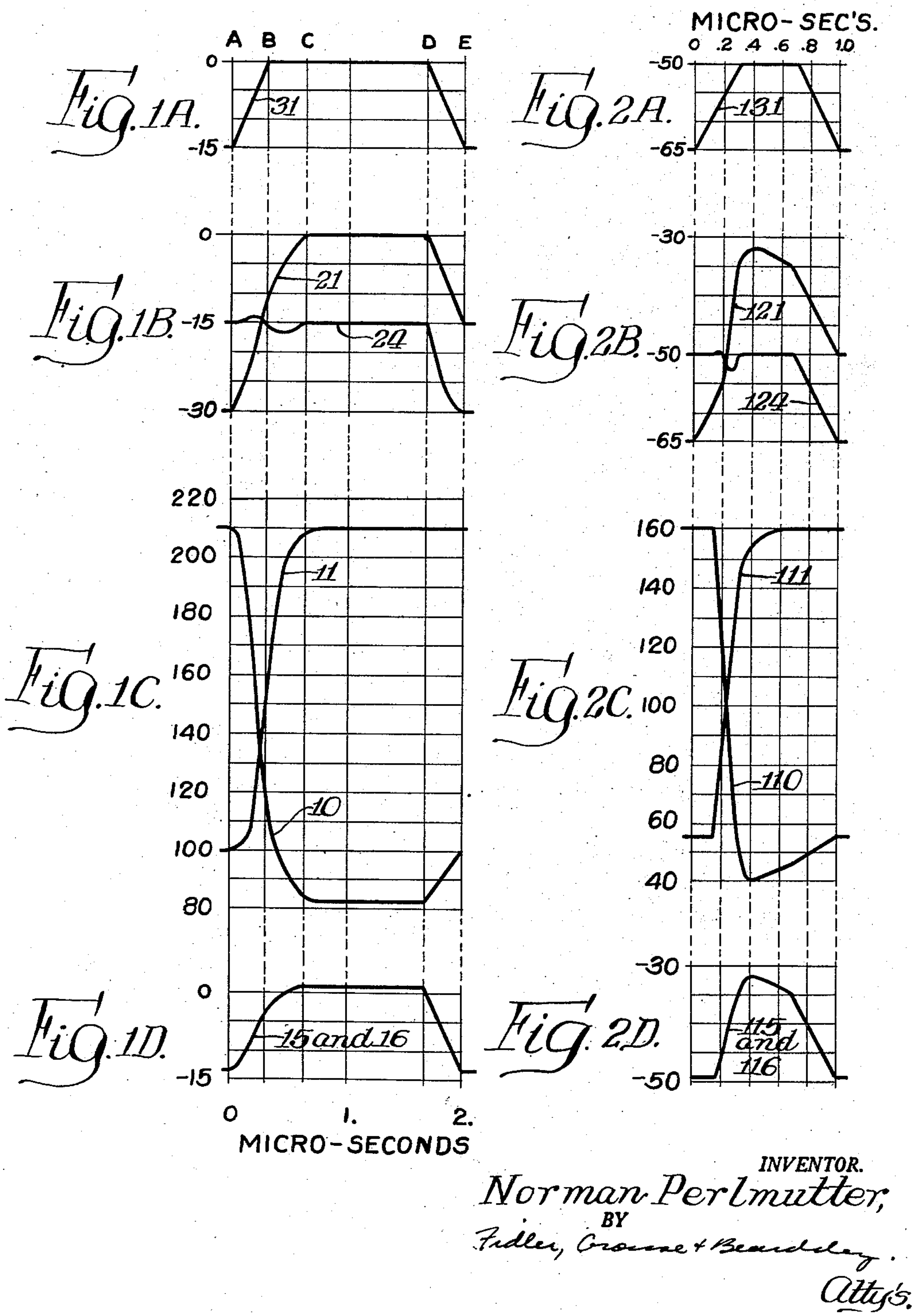
Figs. 1A to 1D are graphic representations of the varying potentials at certain points in the circuit of Fig. 1 during an operation from one of its two stable conditions to the other.
Figs. 2A to 2D are graphic representations of the varying potentials at certain points in the circuit of Fig. 2 during an operation from one of its two stable conditions to the other.

In the stable condition assumed to exist prior to the beginning of an input impulse on conductor 31 at time A in the selected example, the potentials with respect to ground are approximately negative 15 volts on conductor 31, negative 13 volts on tube cathodes 15 and 16, negative 30 volts on grid 21 and at junction 34, negative 15 volts on grid 24, positive 210 volts on anode 10 and positive 100 volts on anode 11. Starting at time A, an input impulse having approximately the form and duration shown in Fig. 1A is applied to the input conductor 31 so that the potential on conductor 31 is raised to zero volts or ground potential at time B about one- third of a micro-second later. As the potential on conductor 31 rises to zero volts, the potential on junction 34 rises to about negative 15 volts. As the potential on junction 34 rises, it initiates an increase of potential on the grid 21 (Fig. 1B) which in turn results in an increased flow of current through the tube V1 and a decrease in the potential on the anode 10 (Fig. 1C).

In the interval from time A to time C the potential of the grid 24 may fluctuate somewhat because of several factors but does not change substantially. The values of the circuit components, it will be remembered, are chosen so that, in the absence of a connection between the input coupling circuit and the grid of the conducting tube, the potential on that grid would be substantially higher than required to obtain the desired conduction through that tube. Thus, at time A, a portion of the current carried by the resistor 22 passes through the diode 41. As potential of anode 10 falls, the condenser 23 discharges and tends to depress the potential of the grid 24 but, during the interval from time A to time B, the potentials of input conductor 31 and junction 34 are rising and the diode 41 stops conducting as the potential of conductor 31 becomes equal to and rises above the potential of the grid 24. The rates of rise of the potential on conductor 31 and of fall of the potential of the anode 10 may be such as to cause some slight rise in potential of the grid 24 while the input impulse is rapidly raising the potential of conductor 31 and the rate of decrease of potential of the anode 10 is still relatively low, followed by a decrease of potential of the grid 24 slightly below negative 15 volts during the more rapid decrease of potential of the anode 10 near time B. Because of the diode 39, the potential on the grid 24 cannot decrease substantially below the potential of the junction 34 even though at time C and somewhat before that time, the potential on grid 24 would, in the absence of a connection between that grid and the junction 34, be driven substantially lower.

As the current through the previously non-conducting tube V1 increases, the total current through the common cathode resistor 17 increases, causing the potentials on the cathodes 15 and 16 to rise while the potential on the grid 24 of the tube V2 remains nearly constant. This reduces the current through the tube V2 but, as this effect is dependent upon an increase in the total current flowing through the common cathode resistor 17, it cannot reduce the current through the tube V2 as rapidly or as greatly as current through the tube V1 increases.

With the circuit components having the values stated above, by way of example, the rise of potential of the anode 11 of the tube V2 as that tube becomes substantially non-conducting would, in the absence of the connection from the grid 21 through diode 40 to conductor 31, raise the potential of grid 21 above the potential of conductor 31. However, because of the diode 40, the potential of grid 21 cannot rise above the potential of conductor 31. That potential on the grid 21, in relation to the potential of the cathode 15, is such that the current conducted through the tube V1 is greater than it will be in the stable conducting condition of the tube when the potential on conductor 31 returns to its normal value.

The shift of potentials on the grids 21 and 24, anodes 10 and 11 and cathodes 15 and 16 initiated when the input impulse appears on the conductor 31, continues until about time C, about another third of a micro-second after the input impulse on conductor 31 reaches its maximum potential at time B. They then reach substantially steady values as shown between times C and D in Figs. 1A to 1D where the potentials are approximately zero volts or ground potential on grid 21, negative 15 volts on grid 24, positive 1 volt on cathodes 15 and 16, positive 210 volts on anode 11 and positive 82 volts on anode 10. It will be seen that the effect of the decrease of potential of anode 10 upon the potential of grid 24 has become sufficient at about time B to restore that grid to its initial value of negative 15 volts and thereafter to depress the potential of grid 24 a little below that value. However, at about time C, the potential of grid 24 is again about negative 15 volts because current from junction 34 through diode 39 brings the potential of grid 24 up to the potential of junction 34 which is then at negative 15 volts. At this time, however, the potential of the anode 10 is sufficiently low that, in the absence of the connection with junction 34 through diode 39, the potential on the grid 24 would be substantially below negative 15 volts.

As the potential of the input impulse on conductor 31 falls off between times D and E, the potential of grid 21 follows the potential of conductor 31 downward because of a small flow of current through diode 40. The potential of the junction 34 also falls and, because of the potential of anode 10, the potential of the negative terminal of battery 18 and the proportions of resistors 22 and 26, the potential of grid 24 is also driven downward as the potential of junction 34 falls. As the potential of grid 21 is reduced, current through the tube V1 is reduced and the potential on the anode 10 rises a little to its normal value for the stable conducting condition of the tube V1. Such reduction of current through tube VI causes a corresponding reduction in the current passing through the common cathode resistor 17 and hence causes the potential on the cathodes to return downward to its normal stable value of about negative 13 volts. It will be noted that though the reduction in potential of cathode 16 results in a certain increase of potential difference between the anode 11 and cathode 16, the tube V2 is in a stable substantially non-conducting condition so that the current through the resistor 13 and the potential of the anode 11 are not appreciably altered.

The rise in potential of the anode 10 is not appreciably reflected on the grid 24. As previously mentioned, the values of the components of the flip-flop circuit are such that in the absence of the connection from the junction 34 through diode 39 to grid 24, the potential on that grid would be substantially lower than that of the junction 34 when the tube V2 is substantially non-conducting. The increase in potential of the anode 10 from time D to time E, therefore, merely causes a reduction but not a cessation of the current flow from junction 34 through diode 39 which is required to prevent the potential of the grid 24 from falling below the potential of junction 34.

At time E which is about 2 micro-seconds later than time A, the operation of the circuit is completed and the circuit is then in the stable condition in which tube V1 is conducting and tube V2 is substantially non-conducting. It will be readily understood that another input impulse applied to the common input conductor 31 will cause the circuit to operate to reverse to the stable condition assumed to exist prior to the above described operation.

It will be noted that as an input impulse appears on the input conductor 31, the potential on the grid of the previously non-conducting tube rises with the rising potential on the conductor 31 for a short time but, before the potential of the input impulse reaches its maximum value, the rate of rise of the potential on the grid of the previously non-conducting tube becomes considerably greater, due to the effect of the rise of potential on the anode of the previously conducting tube. The operation of the circuit is, therefore, notably independent of the duration of the input impulse.

Setting and resetting input impulses may be applied to the conductors 29 and 30 respectively whenever it is desired to place the circuit in either desired one of its two stable conditions. Positive impulses which may correspond to that of Fig. 1A, when applied to the setting input conductor 29 or to the resetting input conductor 30 will be conducted to the grid 21 or 24, respectively, through a respective one of the diodes 27 and 28 which normally isolate the grids from the setting and resetting input sources.

A modification is shown in Fig. 2. The diagrammatic representation of the circuit in Fig. 2 is the same as in Fig. 1 except that the common input is connected through a coupling condenser 100 to the junction 134. The coupling condenser is, of course, not necessary when D. C. couplings are used. Except for V1 and V2, all reference numbers in Fig. 2 are higher by 100 than the reference numbers designating similar elements in Fig. 1. However, for operation with input impulses of the character shown in Fig. 2A and again employing the previously mentioned 12AV7 twin triodes as the tubes V1 and V2, the circuit components of Fig. 2 may have the following values:

*Resistors*

| Ref. No.: | Ohms. |
|---|---|
| 112 | 12,000 |
| 113 | 12,000 |
| 117 | 13,500 |
| 119 | 91,000 |
| 122 | 91,000 |
| 125 | 82,000 |
| 126 | 82,000 |
| 133 | 39,000 |
| 135 | 9,100 |

*Batteries*

| Ref. No.: | Voltage |
|---|---|
| 114 | 250 |
| 118 | 200 |
| 132 | 105 |
| 136 | 50 |

*Condensers*

| Ref. No.: | Mmf. |
|---|---|
| 100 | 1000 |
| 120 | 22 |
| 123 | 22 |

In view of the previous discussion of the operation of the circuit of Fig. 1, the general manner of operation of the circuit of Fig. 2 will be readily understood. Using the above-mentioned 12AV7 tubes and circuit components of the values given above, the potential changes at the points in Fig. 2 designated by the reference numbers applied to the curves of Figs. 2A to 2D will be approximately as shown by those curves in an operation initiated when the tube V1 is in its stable, substantially non-conducting condition and the tube V2 is in its stable conducting condition. The operation is completed in about 1 micro-second.

It will be noted that in the circuit of Fig. 2 and with the values of circuit components suggested above, the potential normally maintained at the junction 134 is about negative 65 volts and the potential on conductor 131 is negative 50 volts. The values of the circuit components are such as, in the absence of the connections between the grids 121 and 124 and the input coupling circuit, to produce a potential substantially below negative 65 volts on the grid of the non-conducting tube and substantially above negative 50 volts on the grid of the conducting tube. However, because of the connections between the grids through the diodes 138, 139, 140 and 141 with the conductor 131 and junction 134, the potential of the grid of the non-conducting tube is prevented from falling below negative 65 volts and the potential on the grid of the conducting tube is prevented from rising above negative 50 volts.

When an input impulse starts to raise the potential at junction 134, it also starts to raise the potential of the grid of the non-conducting tube correspondingly, because of the connection through the diode 138 or 139, and initiates an operation of the circuit to reverse the conducting and non-conducting conditions of the two tubes. The rise of potential of junction 134 caused by the input impulse is not immediately reflected on conductor 131. In the absence of battery 136, the potential on conductor 131 would be substantially below negative 50 volts and would not rise above negative 50 volts until the potential on the junction 134 became higher than negative 55 volts. In the operation corresponding to the curves of Figs. 2A to 2D, as the potential on the junction 134 and, thus, the potential on the grid 121 of the tube V1 rises, and before that potential reaches negative 55 volts, the tube V1 begins to conduct at a rapidly increasing rate. The resulting rapid decrease of potential of the anode 110 causes the potential of the grid 124 of the tube V2 to be reduced a few volts as shown in Fig. 2B immediately after the time .2 micro-second and before the potential of the junction 134 becomes high enough to cause conduction through the diode 139. During the dip in the potential of the grid 124 the potential of the cathodes 115 and 116 is rising rapidly because the rapid increase in current through the tube V1 produces an increase in the total current through the resistor 117 and an increase in the potential drop across the latter. The dip in potential of the grid 124 together with the rising cathode potential produce a sharp decrease of conduction in the tube V2 with a consequently rapid increase of potential of the anode 111 which acts to increase the rate of rise of the potential of the grid 121 of the tube V1. Thus, before the potential of junction 134 rises above negative 55 volts and the potential of the conductor 131 rises above its normal negative 50 volt potential, the regenerative action in the flip flop circuit is in progress and the potential of the anode 110 of the tube V1 is falling so rapidly as to prevent the potential of the grid 124 of the tube V2 from rising when the potential of the conductor 131 subsequently does rise. The rate of rise of the leading edge of the input impulse potential curve is, therefore, not critical. After the rising potential of the junction 134 reaches that of the momentarily depressed potential of the grid 124 and approached its top values, the diode 139 begins to conduct and the potential of the grid 124 then rises with the potential of the junction 134 to about negative 50 volts as shown at the time .3 micro-second in Figs. 2A and 2B.

The rapid rise of potential of the anode 111 of the tube V2 drives the potential of the grid 121 of the tube V1 up to a peak value of about negative 32 volts at about time .4 micro-second, but later, as the charging of the condenser 120 progresses, the potential of grid 121 falls off. When the grid 121 is at its peak potential, the conduction of the tube V1 is somewhat greater and the potential of the anode 110 is lower than in the stable conducting state of the tube, but as the potential of the grid 121 declines from its peak value, the anode current of the tube V1 drops toward its normal value for the stable conducting condition of the tube, the potential of the anode 110 rises toward its stable conducting state value and the cathode potential also declines from its high value as shown between the time .4 and .7 micro-second in Figs. 2B, 2C and 2D.

When the potential on the junction 134 falls off with the decline of the input impulse during the time from about .7 to about 1.0 micro-second, the potential of the grid 124 decreases with the potential of the junction 134 to about negative 65 volts, and would be depressed to a substantially lower value if that were not prevented by conduction through the diode 139. The potential of the grid 121 drops with the potential of the conductor 131 to the normal, negative 50 volt value of the latter, further decrease being prevented by the battery 136 and diode 137. As the potential of the grid 121 falls from about time .7 to about time 1.0 micro-second, the anode current of the tube V1 decreases and the potential of anode 110 rises to their stable conducting state values and the cathode potential declines to its normal value. The operation is then complete and the circuit is in readiness to operate again upon receipt of another input impulse.

It will be readily appreciated that even rather substantial variations in the values of the circuit components in either of the examples described above will not have any substantial detrimental effect on the reliability of operation of the commutation circuit and that very substantial variations in the characteristics of the tubes V1 and V2, such as the changes caused by aging, will not appreciably affect the reliability of operation. In fact, in the circuit of the present invention, the emissivity of the cathodes of the tubes may be permitted to decrease through a large percentage of its average new tube value before discarding and replacing the tubes will become necessary. It will also be appreciated that the circuit of the present invention is very adaptable to operation under widely varying conditions.

I claim:

1. A commutation circuit comprising a bi-stable electronic flip-flop including first and second electron discharge devices each having an anode, a cathode and a control electrode, and an input coupling circuit including a source of potential and a potential divider connected thereto and normally providing at a first point on said divider a first potential which, when applied to the control electrode of either of said devices, maintains such device in stably conducting condition, and providing at a second point on said divider a second potential which, when applied to the control electrode of either of said devices, maintains such device in stably substantially non-conducting condition, a first pair of asymmetrically conducting devices each having a cathode connected by a direct current conductive connection to said first point on said divider and an anode connected by a direct current conductive connection to a respective one of said control electrodes, and a second pair of asymmetrically conducting devices each having an anode connected by a direct current conductive connection to said second point on said divider and a cathode connected by a direct current conductive connection to a respective one of said control electrodes.

2. A commutation circuit comprising a bi-stable electronic flip-flop including first and second electron discharge devices each having an anode, a cathode and a control electrode, and an input coupling circuit including a source of potential and a potential divider normally providing at a first point on said divider a first potential which, when applied to the control electrode of either of said devices, maintains such device in stably conducting condition, and providing at a second point on said divider a second potential which, when applied to the control electrode of either of said devices, maintains such device in a stably substantially non-conducting condition, said source of potential being of said first potential value, asymmetrical conducting means having an anode connected by a direct current conductive connection to the latter potential source and a cathode connected by a direct current conductive connection to said first point, a first pair of asymmetrically conducting devices each having a cathode connected by a direct current conductive connection to said first point on said divider and an anode connected by a direct current conductive connection to a pair of asymmetrically conducting devices each having an anode connected by a direct current conductive connection to said second point on said divider and a cathode connected by a direct current conductive connection to a respective one of said control electrodes.

3. A commutation circuit comprising a bi-stable electronic flip-flop including first and second electron discharge devices each having an anode, a cathode and a control electrode, a potential source, a resistor having one terminal connected to both of said cathodes and another terminal connected to said potential source, and circuit means connected to the latter terminal and to the anode of each of said devices, and means connecting the control electrode of each of said devices with the portion of the circuit means connected between such latter terminal and the anode of the other of said devices, and an input coupling circuit including a source of potential and a potential divider connected thereto and normally providing at one point on said divider a first potential of a value within a range suitable, when applied to the control electrode of either of said devices, to maintain such device in stably conducting condition, and providing at a second point on said divider a potential of a value within a range suitable, when applied to the control electrode of either of said devices, to maintain such device in stably substantially non-conducting condition, a first pair of diodes each having a cathode connected by a direct current conductive connection to said first point on said divider and an anode connected by a direct current conductive connection to a respective one of said control electrodes, and a second pair of diodes each having an anode connected by a direct current conductive connection to said second point on said divider and a cathode connected by a direct current conductive connection to a respective one of said control electrodes.

4. An electronic commutator comprising a bi-stable electronic flip-flop circuit and an input coupling circuit, said flip-flop circuit including first and second electronic discharge devices each having an anode, a cathode and a control electrode, current supply means having a positive potential terminal and a negative potential terminal, first and second anode resistance means having a common connection with said positive potential terminal and each connected to the anode of a respective one of said discharge devices, circuit means connecting said cathodes to said negative potential terminal, each of said devices being in a relatively highly conducting condition when the potential on its control electrode is of a predetermined first value but in a substantially non-conducting condition when the potential on its control electrode is at a predetermined lower second value, and first and second voltage divider resistance means each having a connection to said cathode circuit means, the anodes of said discharge devices being connected each to a respective one of said dividers and the control electrodes of the same devices being each connected to the other one, respectively, of said dividers at an intermediate point the potential of which, in the absence of further connections to said divider, would rise substantially above said predetermined first value when the discharge device having its anode connected to said divider is in said substantially non-conducting condition and would fall substantially below said predetermined second value when the last-mentioned device is in said relatively highly conducting condition, said input coupling circuit including first and second control potential points, means to normally maintain said predetermined first and second potentials on said first and second control points respectively, a first pair of asymmetrically conducting means each having a cathode connected by a direct current conductive connection to said first control point and an anode connected by a direct current conductive connection to a respective one of said control electrodes, a second pair of asymmetrically conducting means each having an anode connected by a direct current conductive connection to said second control point and a cathode connected by a direct current conductive connection to a respective one of said control electrodes, and an impulse input conductor coupled to at least one of said control points to apply thereto an input impulse to initiate a reversal of the conducting and substantialy non-conducting conditions of said discharge devices.

5. An electronic commutator comprising a bi-stable electronic flip-flop circuit and an input coupling circuit, said flip-flop circuit including first and second electronic discharge devices each having an anode, a cathode and a control electrode, current supply means having a positive potential terminal and a negative potential terminal, first and second anode resistance means each having a connection with said positive potential terminal and each connected to the anode of a respective one of said discharge devices, circuit means connecting said cathodes to said negative potential terminal, each of said devices being in a relatively highly conducting condition when the potential on its control electrode is of a predetermined first value but in a substantially non-conducting condition when the potential on its control electrode is a predetermined lower second value, and first and second voltage divider resistance means having a common connection to said cathode circuit means, the anodes of said discharge devices being connected each to a respective one of said dividers and the control electrodes of the same devices being each connected to the other one, respectively, of said dividers at an intermediate point the potential of which, in the absence of further connections to said divider, would rise to a third value above said predetermined first value when the discharge device having its anode connected to said divider is in said substantially non-conducting condition and would fall to a fourth value below said predetermined second value when the last-mentioned device is in said relatively highly conducting condition, said input coupling circuit including first and second control potential points, means to normally maintain said predetermined first and second potentials on said first and second control points respectively, a first pair of asymmetrically conducting means each having a cathode connected by a direct current conductive connection to said first control point and an anode connected by a direct current conductive connection to a respective one of said control electrodes, a second pair of asymmetrically conducting means each having an anode connected by a direct current conductive connection to said second control point and a cathode connected by a direct current conductive connection to a respective one of said control electrodes, and an impulse input conductor coupled to at least one of said control points to apply thereto an input impulse to initiate a reversal of the conducting and substantially non-conducting conditions of said discharge devices, the difference between said first and third potential values and the difference between said second and fourth potential values being of the same order of magnitude as said input impulse.

6. An electronic commutator comprising a bi-stable electronic flip-flop circuit and an input coupling circuit, said flip-flop circuit including first and second electronic discharge devices each having an anode, a cathode and a control electrode, current supply means having a positive potential terminal and a negative potential terminal, first and second anode resistance means having a common connection with said positive potential terminal and each connected to the anode of a respective one of said discharge devices, circuit means connecting said cathodes to said negative potential terminal, each of said devices being in a relatively highly conducting condition when the potential on its control electrode is of a predetermined first value but in a substantially non-conducting condition when the potential on its control electrode is at a predetermined lower second value, and first and second voltage divider resistance means having a common connection to said cathode circuit means, the anodes of said discharge devices being connected each to a respective one of said dividers and the control electrodes of the same devices being each connected to the other one, respectively, of said dividers at an intermediate point the potential of which, in the absence of further connections to said divider, would rise substantially above said predetermined first value when the discharge device having its anode connected to said divider is in said substantially non-conducting condition and would fall substantially below said predetermined second value when the last-mentioned device is in said relatively highly conducting condition, said input coupling circuit including a source of potential and a potential divider connected thereto and normally providing a potential of said first value at a first point on said divider and a potential of said second value at a second point on said divider, a first pair of asymmetrically conducting devices each having a cathode connected by a direct current conductive connection to said first point on said divider and an anode connected by a direct current conductive connection to a respective one of said control electrodes, a second pair of asymmetrically conducting devices each having an anode connected by a direct current conductive connection to said second point on said divider and a cathode connected by a direct current conductive connection to a respective one of said control electrodes, and an impulse input conductor coupled to at least one of said points to apply thereto an input impulse to initiate a reversal of the conducting and substantially non-conducting conditions of said discharge devices.

7. An electronic commutator comprising a bi-stable electronic flip-flop circuit and an input coupling circuit, said flip-flop circuit including first and second electronic discharge devices each having an anode, a cathode and a control electrode, current supply means having a positive potential terminal and a negative potential terminal, first and second anode resistance means having a common connection with said positive potential terminal and each connected to the anode of a respective one of said discharge devices, circuit means connecting said cathodes to said negative potential terminal, each of said devices being in a relatively highly conducting condition when the potential on its control electrode is of a predetermined first value but in a substantially non-conducting condition when the potential on its control electrode is at a predetermined lower second value, and first and second voltage divider resistance means having a common connection to said cathode circuit means, the anodes of said discharge devices being connected each to a respective one of said dividers and the control electrodes of the same devices being each connected to the other one, respectively, of said dividers at an intermediate point, the potential of which, in the absence of further connections to said divider, would rise substantially above said predetermined first value when the discharge device having its anode connected to said divider is in said substantially non-conducting condition and would fall substantially below said predetermined second value when the last-mentioned device is in said relatively highly conducting condition, said input coupling circuit including a source of potential and a potential divider normally providing a potental of said first value at a first point on said divider and a potential of said second value at a second point on said divider, a first pair of diodes each having a cathode connected by a direct current conductive connection to said first point on said divider and an anode connected by a direct current conductive connection to a respective one of said control electrodes, a second pair of diodes each having an anode connected by a direct current conductive connection to said second point on said divider and a cathode connected by a direct current conductive connection to a respective one of said control electrodes, a source of potential of said first value, a further diode having an anode connected to said last-named potential source and a cathode connected to said first point, and an impulse input conductor coupled to at least one of said points to apply thereto an input impulse to initiate a reversal of the conducting and substantially non-conducting conditions of said discharge devices.

8. A circuit comprising a multivibrator including first and second electron discharge devices each including a control electrode, and an input coupling circuit comprising two stable potential terminals, one terminal of which normally provides a direct current potential which, when applied to the control electrode of either of said devices, maintains such device in stably conducting condition, and the other terminal of which normally provides a second direct current potential which, when applied to the control electrode of either of said devices, maintains such device in stably substantially non-conducting condition, two asymmetrically conducting means each having a cathode connected by a low resistance direct current conductive connection to said one terminal and having an anode connected by a low resistance direct current conductive connection to a respective one of said control electrodes, two further asymmetrically conducting means each having an anode connected by a low resistance direct current conductive connection to said other terminal and a cathode connected by a low resistance direct current conductive connection to a respective one of said control electrodes, and means for applying a switching potential to said one of said terminals.

9. A circuit comprising a multivibrator including first and second electron discharge devices each having an anode, a cathode and a control electrode, and an input coupling circuit comprising two stable potential terminals, one terminal of which normally provides a direct current potential which, when applied to the control electrode of either of said devices, maintains such device in a stably conducting condition, and the other terminal of which normally provides a second direct current potential which, when applied to the control electrode of either of said devices, maintains such device in a stably substantially non-conducting condition, at least one asymmetrically conducting means having a cathode connected by a direct current conductive connection to said one terminal and an anode connected by a low resistance direct current conductive connection to a respective one of said control electrodes, at least one further asymmetrically conducting means having an anode connected by a direct current conductive connection to said other terminal and a cathode connected by a low resistance direct current conductive connection to a respective one of said control electrodes, and means for applying switching potential to said one of said terminals.

10. A circuit as defined in claim 9 wherein one of said at least one asymmetrically conducting means and one of said at least one further asymmetrically conducting means being connected to a common control electrode and a signal developing impedance connected in the cathode circuit of the discharge device including such control electrode.

11. A circuit comprising a multivibrator including first and second electron discharge devices each having an anode, a cathode and a control electrode, and an input coupling circuit comprising two stable potential terminals, one terminal of which normally provides a direct current potential which, when applied to the control electrode of either of said devices, maintains such device in a stably conducting condition, and the other terminal of which normally provides a second direct current potential which, when applied to the control electrode of either of said devices, maintains such device in a stably substantially non-conducting condition, two asymmetrically conducting devices having the cathodes thereof connected by a direct current conductive connection to said one terminal and the anodes thereof connected by low resistance direct current conductive connection to a respective one of said control electrodes, two further asymmetrically conducting devices having the anodes thereof connected by a direct current conductive connection to said other terminal and the cathodes thereof connected by a low resistance direct current conductive connection to a respective one of said control electrodes, and a signal developing resistance device coupling at least one of said cathodes of said discharge devices to a reference potential position relative to the potentials at both said terminals.

12. A commutation circuit comprising a bi-stable electronic flip-flop including first and second electron discharge devices each having a control electrode, and an input coupling circuit including a source of potential and a potential divider connected to said source of potential and normally providing at a first point on said divider a first potential which, when applied to the control electrode of one of said devices, maintains such device in stably conducting condition, and providing at a second point on said divider a second potential which, when applied to the control electrode of said one device, maintains such device in stably substantially non-conducting condition, a first asymmetrically conducting device having a cathode connected by a direct current conductive connection to said first point on said divider and an anode connected by a direct current conductive connection to said control electrode of said one discharge device, a second asymmetrically conducting device having an anode connected by a direct current conductive connection to said second point on said divider and a cathode connected by a direct current conductive connection to said last named control electrode, and means for applying a switching potential to one of said points of said divider.

13. A commutation circuit comprising a bi-stable electronic flip-flop including first and second electron discharge devices each having a control electrode, and an input coupling circuit including a source of potential providing at one terminal a potential which, when applied to the control electrode of one of said devices, maintains such device in stably conducting condition, a voltage divider, asymmetrical means having an anode connected by a direct current conductive connection to said one terminal of said potential source, and a cathode connected by a direct current conductive connection to one terminal of said voltage divider, the other terminal of said voltage divider being connected to the other terminal of said source, a first asymmetrically conducting device having a cathode connected by a direct current conductive connection to said one terminal of said divider and an anode connected by a direct current conductive connection to the control electrode of one of said devices, and a second asymmetrically conducting device having a cathode connected by a direct current conductive connection to said last named control electrode and an anode connected by a direct current conductive connection to a point on said divider providing a potential which, when applied to the control electrode of said one device, maintains such device in a stably substantially non-conducting condition.

14. A commutation circuit comprising a bi-stable electronic flip-flop including first and second electron discharge devices each having a control electrode, and an input coupling circuit including a source of direct current potential, a voltage divider, an asymmetrically conducting device having an anode connected by a direct current conductive connection to the positive terminal of said direct current potential source, and a cathode connected by a direct current conductive connection to one terminal of said voltage divider, the other terminal of said voltage divider connected to the other terminal of said source, an asymmetrically conducting device having an anode connected by a direct current conductive connection to a point on said divider providing a direct current potential which, when applied to the control electrode of said one device, maintains such device in a stably substantially non-conducting condition and a cathode connected by a direct current conductive connection to the control electrode of one of said discharge devices, voltage limiting means connected to said last named control electrode to limit the positive going voltage swing thereof to a potential that maintains said discharge device in stably conducting condition, and means for applying a switching potential across at least a portion of said divider.

15. A commutation circuit comprising a bi-stable electronic flip-flop including first and second electronic amplifying devices each having a control electrode, and an input coupling circuit including a source of direct current potential and a potential divider connected to said source normally providing at a first point on said divider a substantially fixed first direct current potential which, when applied to the control electrode of one of said devices, maintains such one device in stably highly conducting condition and at a second point on said divider a second direct current potential which, when applied to the control electrode of one of said devices, maintains such one device in a lower conducting state, an asymmetrically conducting device for limiting the negative going voltage swing on the control electrode of one of said devices to approximately said second direct current potential, said asymmetrical conducting device having an anode connected by a direct current conductive connection to said second point on said divider and a cathode connected by a direct current conductive connection to said control electrode of said one amplifying device, voltage limiting means connected by a direct current conductive connection to said first point on said divider including said last named control electrode for limiting the positive going voltage swing thereof to approximately said first direct current potential, said last named means being asymmetrically conducting, and means for applying a switching potential across at least a portion of said potential divider.

References Cited in the file of this patent

UNITED STATES PATENTS

| | | |
|---|---|---|
| 2,478,683 | Bliss | Aug. 9, 1949 |
| 2,524,953 | Baker | Oct. 10, 1950 |
| 2,556,935 | Mulligan | June 12, 1951 |
| 2,602,896 | Whitaker | July 8, 1952 |
| 2,644,887 | Wolfe | July 7, 1953 |
| 2,647,208 | De Jager | July 28, 1953 |

UNITED STATES PATENT OFFICE

CERTIFICATE OF CORRECTION

Patent No. 2,857,516 October 21, 1958

Norman Perlmutter

It is hereby certified that error appears in the printed specification of the above numbered patent requiring correction and that the said Letters Patent should read as corrected below.

Column 3, line 31, for "althrough" read -- although --; line 39, for "larger" read -- large --; column 8, line 69, after "connection to a" insert -- respective one of said control electrodes, and a second --.

Signed and sealed this 10th day of February 1959.

(SEAL)

Attest:

KARL H. AXLINE
Attesting Officer

ROBERT C. WATSON
Commissioner of Patents